United States Patent
Daugela et al.

(10) Patent No.: US 9,905,273 B2
(45) Date of Patent: Feb. 27, 2018

(54) METHODS AND DEVICES FOR DETECTING SHOCK EVENTS

(71) Applicant: Seagate Technology LLC, Cupertino, CA (US)

(72) Inventors: Antanas Daugela, Bloomington, MN (US); Neal F. Gunderson, Minneapolis, MN (US); Reed D. Hanson, Chaska, MN (US); Ricardo P. Freeman, Northfield, MN (US); Andrew R. Motzko, Delano, MN (US); Erik J. Lindquist, Oakdale, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/138,280

(22) Filed: Apr. 26, 2016

(65) Prior Publication Data
US 2017/0309312 A1 Oct. 26, 2017

(51) Int. Cl.
*G11B 33/08* (2006.01)
*G11B 33/10* (2006.01)

(52) U.S. Cl.
CPC .............. *G11B 33/08* (2013.01); *G11B 33/10* (2013.01)

(58) Field of Classification Search
CPC .................................. G11B 33/08; G11B 33/10
See application file for complete search history.

(56) References Cited

U.S. PATENT DOCUMENTS

| | | | | |
|---|---|---|---|---|
| 5,526,208 A * | 6/1996 | Hatch | .................. | G11B 5/4846 360/245.8 |
| 5,978,178 A * | 11/1999 | Adley | .................. | G11B 5/4833 360/244.4 |
| 6,310,749 B1 * | 10/2001 | Beatty | .................. | G11B 5/4813 360/265.7 |
| 6,553,807 B2 * | 4/2003 | Luk | ........................ | G11B 33/08 73/12.09 |
| 6,583,964 B1 * | 6/2003 | Huang | .................. | G11B 5/4813 360/294.4 |
| 6,731,466 B2 * | 5/2004 | Arya | .................... | G11B 5/4833 360/244.3 |
| 6,775,104 B2 * | 8/2004 | Hong | ................... | G11B 5/4833 360/244.1 |
| 6,888,694 B2 * | 5/2005 | Guo | ...................... | G11B 21/106 360/77.03 |
| 6,935,925 B1 | 8/2005 | Agrawal et al. | | |

(Continued)

OTHER PUBLICATIONS

Daugela et al. "Drive level acoustic defectoscopy for head disc interface (HDI) integration and manufacturing". Microsystem Technologies. vol. 18, No. 3. pp. 1425-1430. 2012.

(Continued)

*Primary Examiner* — Brian Miller
(74) *Attorney, Agent, or Firm* — Faegre Baker Daniels LLP (57) ABSTRACT

An apparatus includes an actuator assembly, a dampening assembly coupled to the actuator assembly, and a vibration sensor assembly coupled to the dampening assembly and coupled to the actuator assembly by way of the dampening assembly. A method includes attaching a dampening assembly to an actuator assembly and attaching a vibration sensor assembly to the dampening assembly. The dampening assembly is positioned between the vibration sensor assembly and the actuator assembly.

19 Claims, 6 Drawing Sheets

(56) References Cited

U.S. PATENT DOCUMENTS

| | | | |
|---|---|---|---|
| 6,977,790 B1* | 12/2005 | Chen | G11B 5/4833 29/603.03 |
| 7,016,139 B2 | 3/2006 | Baumgart et al. | |
| 7,221,532 B1* | 5/2007 | Shukla | G11B 5/59638 360/264.1 |
| 7,420,778 B2* | 9/2008 | Sassine | G11B 5/4833 360/244.9 |
| 7,522,384 B2* | 4/2009 | Ho | G11B 5/4846 360/264.2 |
| 7,742,255 B2 | 6/2010 | Daugela et al. | |
| 7,760,457 B1* | 7/2010 | Gunderson | G11B 5/6005 360/25 |
| 7,813,083 B2* | 10/2010 | Guo | G11B 5/4813 360/245.9 |
| 7,859,795 B2* | 12/2010 | Kerner | G11B 5/5526 360/244.9 |
| 7,929,254 B2* | 4/2011 | Soga | G11B 5/4833 360/244.3 |
| 8,111,485 B2 | 2/2012 | Freeman et al. | |
| 8,228,639 B2* | 7/2012 | Huang | G11B 5/4846 360/264.2 |
| 8,270,120 B2* | 9/2012 | Kerner | G11B 5/4846 360/245.9 |
| 8,345,387 B1* | 1/2013 | Nguyen | G11B 5/4833 360/265.9 |
| 8,432,641 B1* | 4/2013 | Nguyen | G11B 5/4833 360/265.9 |
| 8,861,141 B2* | 10/2014 | Bjorstrom | G11B 5/4833 360/244.8 |
| 8,941,951 B2* | 1/2015 | Bennin | G11B 5/486 360/240 |
| 8,941,952 B1* | 1/2015 | Pan | G11B 5/4846 360/244.1 |
| 2005/0057834 A1* | 3/2005 | Hirano | G11B 5/4826 360/31 |
| 2010/0007983 A1* | 1/2010 | Funabashi | G11B 5/5569 360/75 |
| 2010/0053804 A1* | 3/2010 | MacKinnon | G11B 5/4953 360/97.19 |
| 2010/0123976 A1* | 5/2010 | Freeman | G11B 5/4806 360/264.2 |
| 2013/0114162 A1* | 5/2013 | Zhang | G11B 5/5582 360/97.19 |
| 2015/0170690 A1* | 6/2015 | Contreras | G11B 5/486 360/264.2 |
| 2015/0287428 A1* | 10/2015 | Kerner | G11B 5/4806 360/244.2 |

OTHER PUBLICATIONS

Daugela et al. "Passive acoustic monitoring of head disc interface interactions". Microsystem Technologies. vol. 16. pp. 77-83. 2010.

Daugela et al. "Ultra sensitive in-situ acoustic characterization system for HDD head disc interface defectoscopy". Mirosystem Technologies. vol. 13. pp. 1185-1191. 2007.

* cited by examiner

METHODS AND DEVICES FOR DETECTING SHOCK EVENTS

SUMMARY

In certain embodiments, an apparatus includes an actuator assembly, a dampening assembly coupled to the actuator assembly, and a vibration sensor assembly coupled to the dampening assembly and coupled to the actuator assembly by way of the dampening assembly.

In certain embodiments, a method includes attaching a dampening assembly to an actuator assembly and attaching a vibration sensor assembly to the dampening assembly. The dampening assembly is positioned between the vibration sensor assembly and the actuator assembly.

In certain embodiments, a hard drive includes a base deck and a cover coupled together to form a cavity. The hard drive also includes an actuator assembly coupled to the base deck and positioned within the cavity and further includes a vibration sensor assembly having a vibration sensor. The hard drive includes a means for dampening amplitudes of a servo-write off-track event. The means for dampening is coupled to and positioned between the actuator assembly and the vibration sensor assembly.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Data storage devices, like hard drives, may include components formed of a variety of materials—each with its own coefficient or rate of thermal expansion. As temperature of hard drive components increase, the different thermal-expansion rates cause stress between interfaces of components made of dissimilar materials. Sometimes the stress becomes too great that an interface gives way, resulting in a burst of energy (e.g., a shock event) that induces waves that propagate to other hard drive components, such as suspensions and actuator assemblies. Shock events can cause errors during data reading and writing operations.

In addition to these shock events, hard drives may experience disturbances caused by other internal disturbances, such as a read/write head contacting a magnetic recording medium or particle and subsequently modulating. Hard drives may also be subject to external disturbances (e.g., impacts to a hard drive's exterior) that can cause errors when reading or writing data. Certain embodiments of the present disclosure are accordingly directed to systems, devices, and methods for reducing reading and writing errors.

Figure 1:
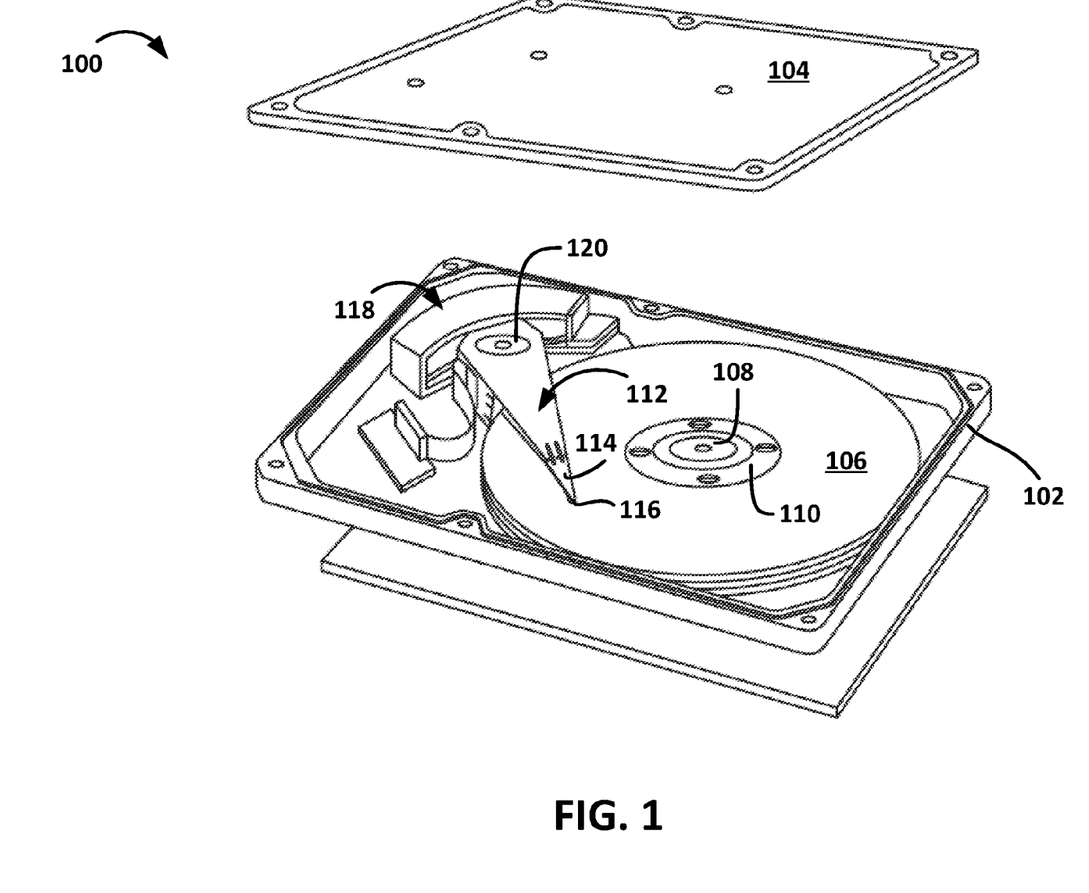
FIG. 1 shows an exploded, perspective view of a hard drive, in accordance with certain embodiments of the present disclosure.

FIG. 1 shows an exploded, perspective view of a hard drive 100 having a base deck 102 and top cover 104. The hard drive 100 includes magnetic recording discs 106 coupled to a spindle motor 108 by a disc clamp 110. The hard drive 100 also includes an actuator assembly 112 coupled to a suspension 114 that positions read/write heads 116 over data tracks on the magnetic records discs 106. As appreciated by one skilled in the art, the read/write heads 116 may be coupled to the suspension 114 by a head-gimbal assembly (HGA) (not shown). During operation, the spindle motor 108 rotates the magnetic recording discs 106 while the actuator assembly 112 is driven by a voice coil motor assembly 118 to pivot around a pivot bearing 120. The actuator assembly 112 may be coupled to the pivot bearing 120 by an adhesive or a tolerance ring (not shown).

As previously mentioned, components of the hard drive 100 are formed from a variety of materials. For example, the actuator assembly 112 and the pivot bearing 120 may be formed of different metals each of which may have a different rate of thermal expansion. As temperature of the actuator assembly 112 and the pivot bearing 120 increases, an interface (e.g., a bi-metallic interface) between the actuator assembly 112 and the pivot bearing 120 may become overly-stressed, causing the interface to release a burst of energy to relieve the stress. For example, to relieve stress at an interface, the materials may suddenly slip or move relative to each other. The burst of energy (e.g., a shock event) propagates outward as a wave or waves, for example, within the actuator assembly 112. Shock events have been found to have a short duration but large amplitude, causing the actuator assembly 112 to vibrate such that the actuator assembly 112 is unable to accurately maintain a desired position over the magnetic recording discs 106. For example, the read/write heads 116 may be reading data from or writing data to a desired track on one of the magnetic recording discs 106 when the shock event occurs. The shock event may cause the actuator assembly 112 and the read/write heads 116 to move off the desired track (i.e., off-track). This results in writing or reading errors because the read/write heads 116 are knocked off-track in between positioning zones (e.g., servo zones) on the magnetic recording discs 106, making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data.

It has been found to be difficult to detect and process the above-described shock events because of the associated large amplitudes and short duration. For example, vibration sensors designed for quick responses are needed to detect a shock event within a desired time period. However, those vibrations sensors are generally too sensitive, such that the vibration sensors (e.g., the related output signals and processing circuitry) become oversaturated by the large amplitudes associated with the shock events. Moreover, the high sensitivity of these sensors may cause false-positive indications of shock events as these sensors could treat non-shock events as actual shock events.

Figure 2:
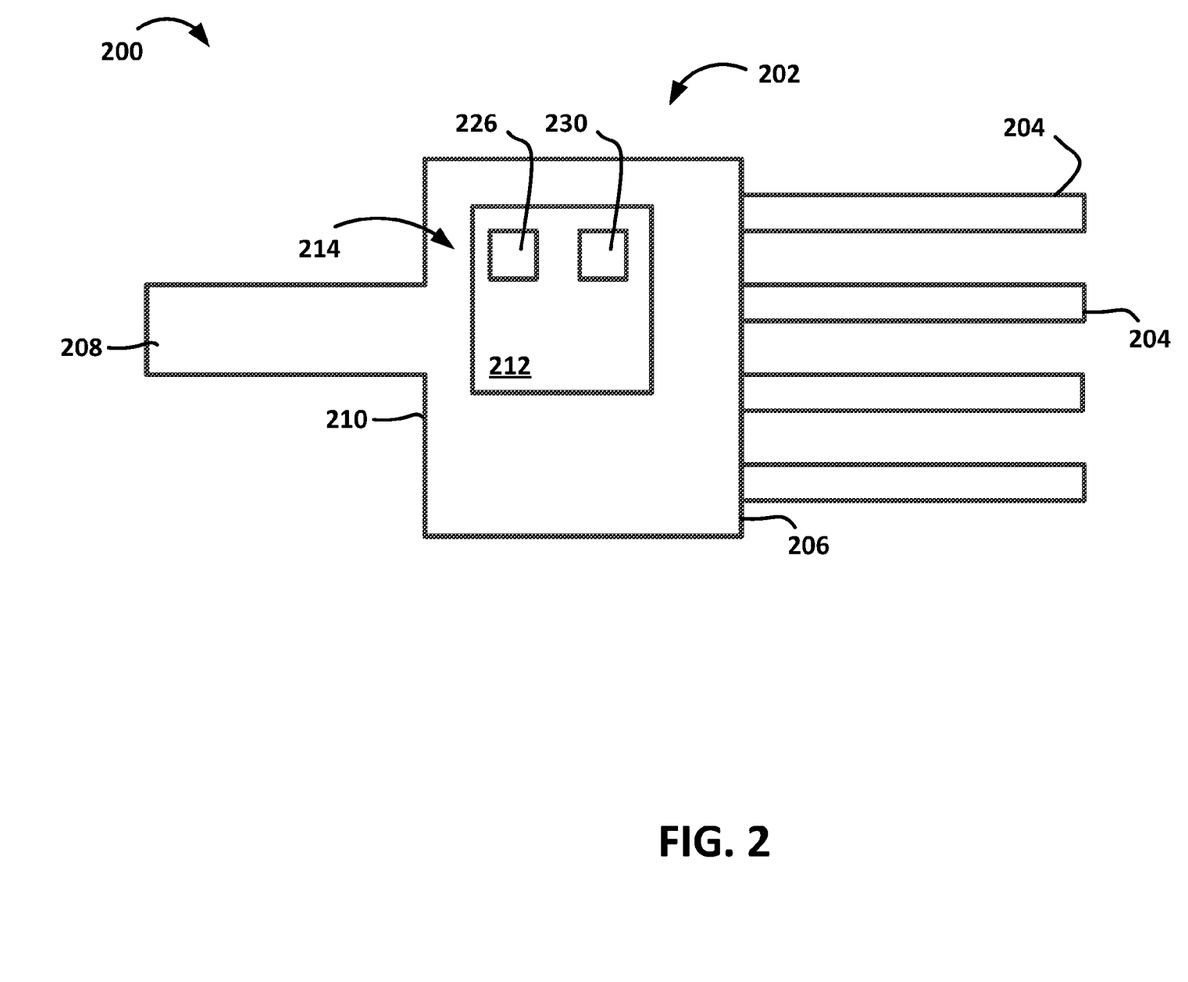
FIG. 2 shows a side view of an actuator assembly, in accordance with certain embodiments of the present disclosure.
Figure 3:
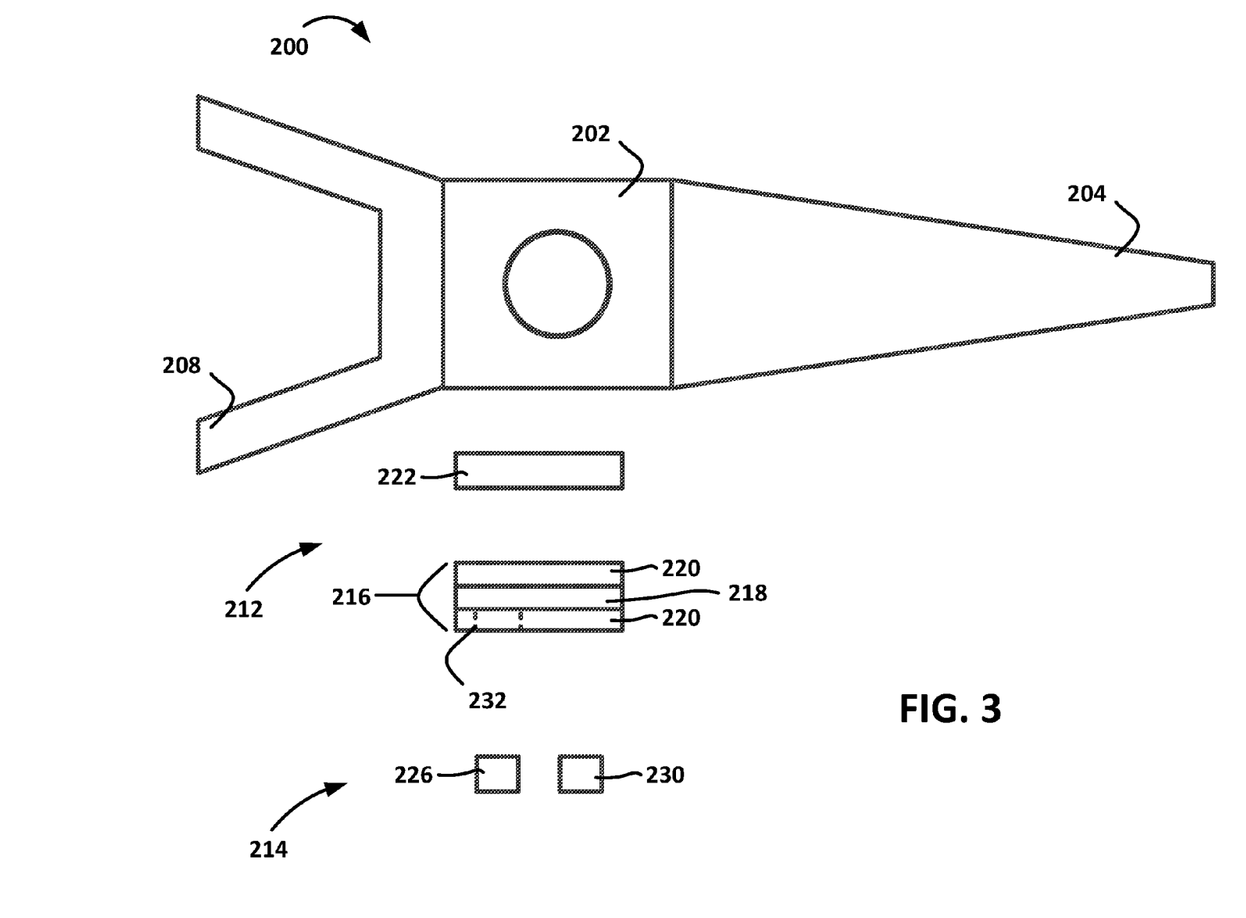
FIG. 3 shows an exploded, top view of the actuator assembly of FIG. 2.

FIG. 2 shows a side view of an actuator assembly 200 for use in the hard drive 100. FIG. 3 shows an exploded, top view of the actuator assembly 200. The actuator assembly 200 includes a main body portion 202 from which a plurality of arms 204 extend from a first side 206 of the main body 202 and from which a voice coil shelf 208 extends from a second side 210 of the main body 202 opposite the first side 206.

Figure 4:
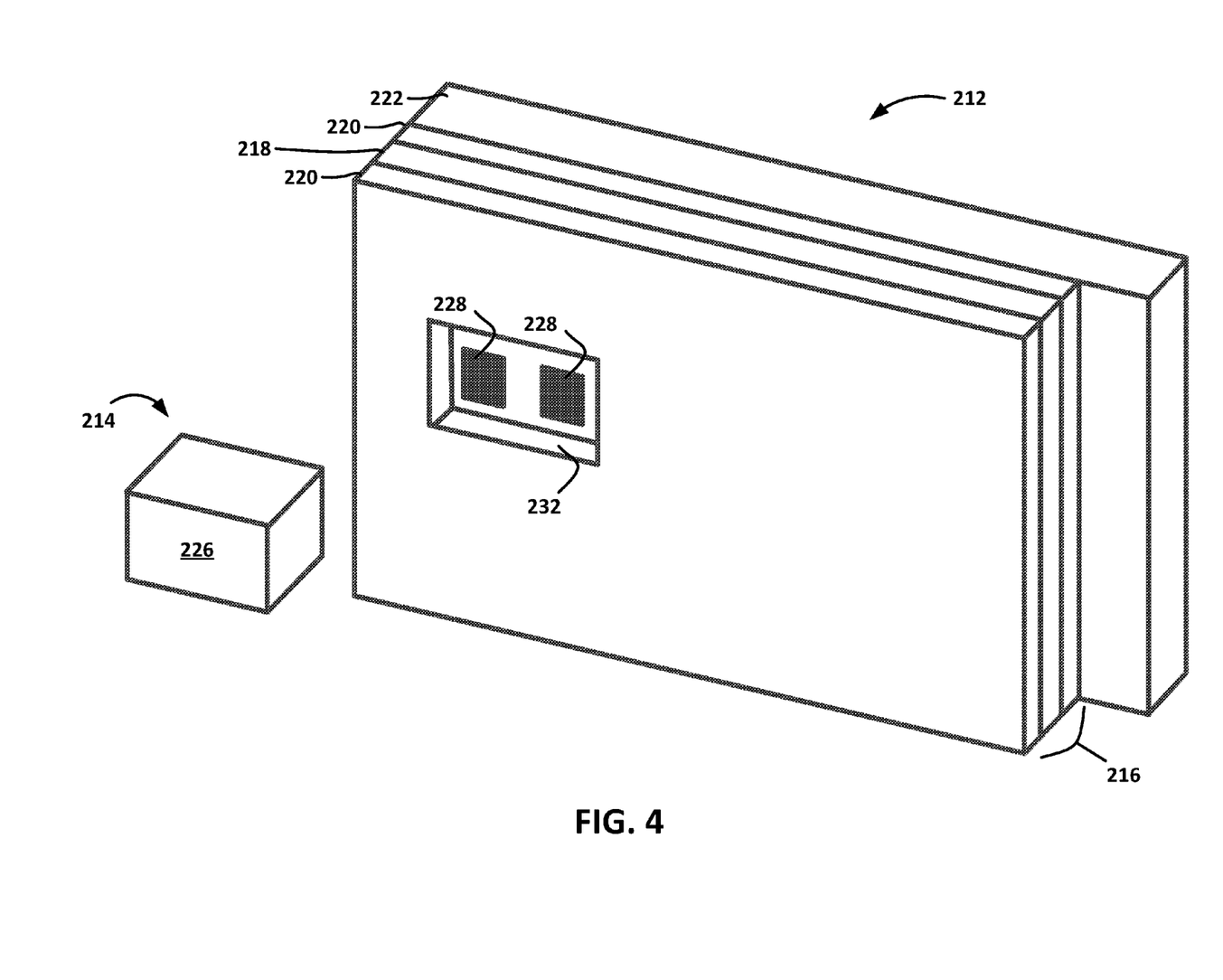
FIG. 4 shows an exploded, cut-away perspective view of a dampening filter assembly and a vibration sensor assembly of FIGS. 2-3, in accordance with certain embodiments of the present disclosure.

Coupled to the main body 202 are a dampening assembly 212 and a vibration sensor assembly 214, which can be seen in more detail in FIG. 4 showing an exploded, cut-away perspective view of the dampening assembly 212 and the vibration sensor assembly 214. Although shown as being coupled to one side of the actuator assembly 200, the present disclosure contemplates that the dampening assembly 212 and the vibration sensor assembly 214 may be coupled elsewhere on the actuator assembly 200 or hard drive 100. For example, the dampening assembly 212 and the vibration sensor assembly 214 may be attached to the voice coil shelf 208 or other surfaces of the actuator assembly 200.

The dampening assembly 212 is positioned between the main body 202 and the vibration sensor assembly 214 and may include a variety of materials that dampen vibration to the vibration sensor assembly 214. For example, the dampening assembly 212 may include a portion of a flex circuit 216 having various layers that dampen amplitudes of waves caused by a shock event. The flex circuit 216 may include multiple conductive layers 218 (though only one layer is shown in FIGS. 3 and 4) formed of copper, for example, and sandwiched between layers of polyimide or various polymers 220 used in flexible circuits. The dampening assembly 212 may also include a stiffener 222 coupled to the main body 202 and that provides some structural rigidity to the dampening assembly 212. The stiffener 222 may be formed of a metal like aluminum and/or the like and coupled to the main body 202 by an epoxy, which may provide some dampening. In some embodiments, the stiffener 222 extends and is partially cantilevered from the main body 202. Certain features (e.g., material, volume, weight, shape) of the various components of the dampening assembly 212 can be modified for a desired dampening effect. The flex circuit 216 facilitates transmission of electrical signals to and from read/write heads and is also coupled to a preamplifier 224 discussed in more detail below.

The vibration sensor assembly 214 may include a vibration sensor 226 like a piezoelectric-based sensor or equivalent. The vibration sensor 226 may be designed to resonate at a particular bandwidth, which may be determined based on a desired level of sensitivity, response time, etc. In some embodiments, a bandwidth of interest may range from 50-400 kHz, 70-120 kHz, 67-113 kHz, 20-67 kHz, or 113-220 kHz. The vibration sensor 226 may sense multidirectional vibration modes (e.g., horizontal, vertical) by monitoring waves generated as a result of a disturbance like a shock event. The disturbance may be, for example, an internal shock event like one caused by differing thermal expansion rates of hard drive components or caused by a read/write head (such as 116 in FIG. 1) contacting a magnetic recording medium (such as 106 in FIG. 1), among other internal shock events. The disturbance may also be an external shock event like one caused by dropping or slamming the hard drive 100 against a surface.

The vibration sensor assembly 214 is coupled to the dampening assembly 212 by solder pads 228 (see FIG. 4), which mechanically and electrically couple the vibration sensor 226 (and therefore vibration sensor assembly 214) to the conductive layer 218 and which assist with dampening vibrations to the vibration sensor 226. To permit the vibration sensor 226 to couple to the conductive layer 218, the polyimide or polymer layer 220 includes a cut-away portion 232 (see FIG. 4) which exposes a portion of the conductive layer 218. The vibration sensor 226 is electrically coupled to a preamplifier 230, which processes various control and communication signals of the hard drive 100 and is described below in more detail with respect to FIG. 6.

A portion of the vibration sensor assembly 214 extends within the cutaway portion 232 to couple to the conductive layer 218. As such, the vibration sensor assembly 214 is not directly coupled to the main body 202. Instead, the dampening assembly 212 acts as an intervening dampener that dampens amplitudes of disturbances. Such dampening helps address the risk of the vibration sensor 226 and related processing circuitry from becoming oversaturated by large amplitudes associated with a shock event while permitting use of a vibration sensor that is sensitive and quick enough to detect a shock event. As such, a hard drive can invoke corrective measures (discussed in detail below) to compensate for shock events—thus reducing reading and writing errors. The dampening assembly 212 also dampens unwanted lower amplitude disturbances to the vibration sensor 226 that would otherwise cause false-positive indications of a shock event. In some embodiments, the vibration sensor assembly 214 is directly coupled to both the conductive layer 218 and one of the polyimide layers 220. In some embodiments, the vibration sensor assembly 214 is indirectly coupled to the conductive layer 218 via solder pads 228. In some embodiments, an adhesive may be positioned within a portion of the cutaway portion 230. As shown in FIG. 4, the vibration sensor assembly 214 is separated from the main body 202 by the solder pads 228, the conductive layer 218, at least one of the polyimide layers 220, and the stiffener 222—which together assist with dampening amplitudes of waves detected by the vibration sensor 226.

Figure 5:
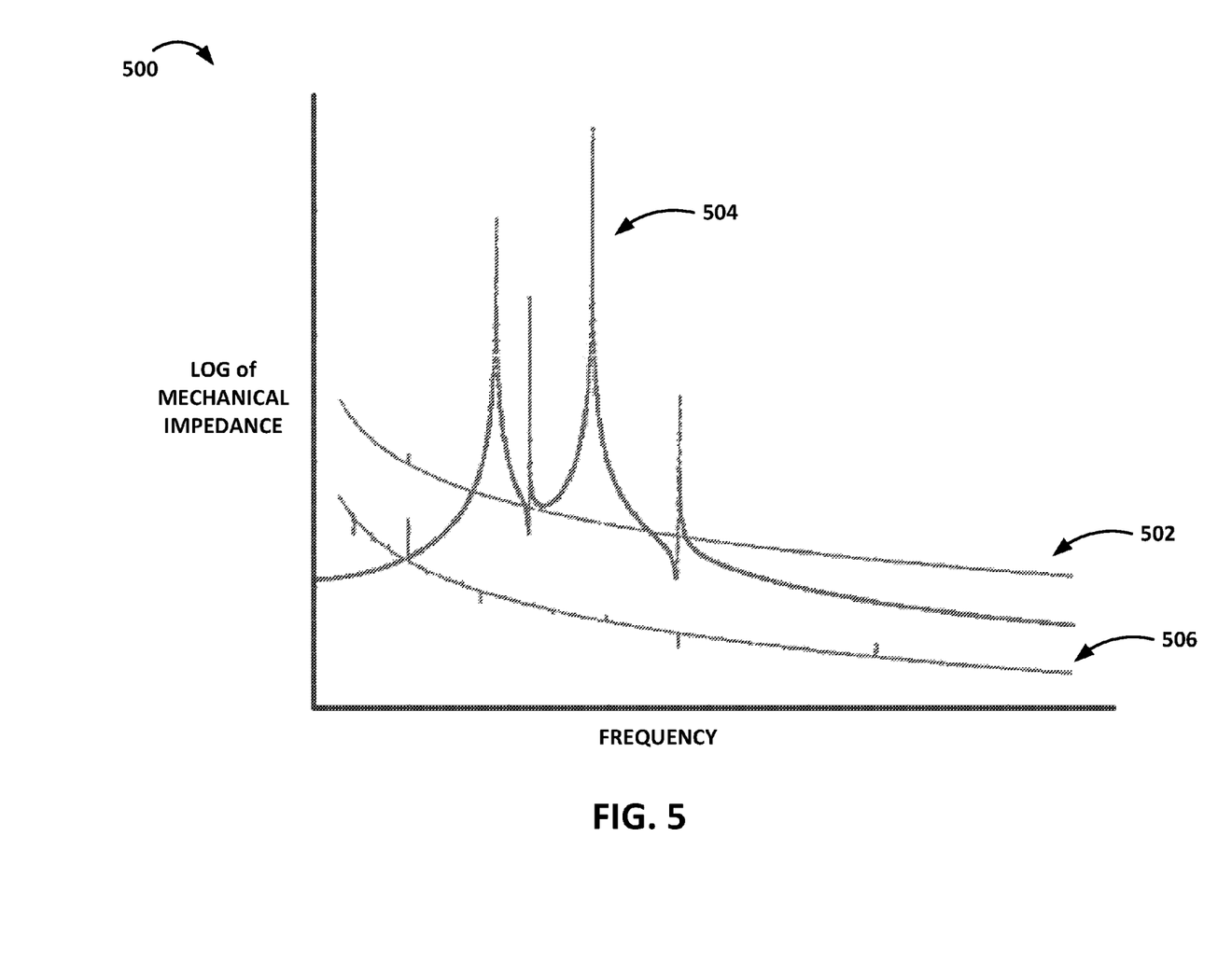
FIG. 5 graphically represents various simulated plots of frequency against mechanical impedance, in accordance with certain embodiments of the present disclosure.

FIG. 5 shows a graph 500 with three plots of frequency against mechanical impedance: a plot 502 of a simulated mechanical impedance function of a head-disc interface (HDI), a plot 504 of a simulated mechanical impedance function of an un-dampened vibration sensor, and a plot 506 of a simulated mechanical impedance function of a damped vibration sensor. The mechanical impedance represents a dynamic mechanical resistance to excitations.

An inverse dynamics approach can be used to simulate the process of acoustic monitoring of HDI interactions during a shock event. In this model, HDI mechanical impedance function, $Z_{HDI}$, including impedance of HGA and slider components and mechanical impedance of the vibration sensor, $Z_{SSWOT}$, with the damper, $Z_{damper}$, are compared as follows:

$$Z_{HDI}(f) \approx Z_{SSWOT}(f) + Z_{damper}(f) \qquad \text{Equation 1:}$$

where, f is monitored frequency bandwidth. The HDI mechanical impedance can be expressed as a sum of the HDI interaction induced dominant HGA and air bearing modes N expressed as harmonics and multiplied by a characteristic mechanical impedance $Z_{HDIchar}$, which can be measured experimentally for a specific HDI. Thus, a function of mechanical impedance $Z_{HDI}$ can be formalized as follows:

$$Z_{HDI} = Z_{HDI\,char} \sum_{i=1}^{N} A_i \cos(2\pi f_i t), \quad i = 1, 2, \ldots, N \quad \text{Equation 2}$$

A mechanical impedance function of a vibration sensor, $Z_{SSWOT}$, can be derived from a Krimholtz-Leedom-Matthaei (KLM) three-port equivalent circuit by adding appropriate boundary conditions:

$$Z_{SSWOT} = \frac{1}{2\pi C_0}\left(1 - \frac{K^2}{\alpha} 2\tan(\alpha/2)\right) \quad \text{Equation 3}$$

where, $C_0$ is dielectric constant and K is a coefficient of electromechanical coupling both parameters of the vibration sensor. Expression $\alpha$ is presented as follows:

$$\alpha = 2\pi f h \sqrt{\frac{\rho}{c}} \quad \text{Equation 4}$$

where, h is a thickness of the piezo component of the vibration sensor, c is sound velocity, and $\rho$ is density. The damper impedance, $Z_{damper}$, is a function of sound velocity, material density, and geometry and can expressed as:

$$Z_{damper} = \frac{\rho c}{h^A (2\pi f t)} \quad \text{Equation 5}$$

The simulated HDI and vibration sensor mechanical impedance matching response is shown in FIG. 5.

The head-disc interface mechanical impedance plot 502 may take into account mechanical impedance of a suspension 114 and head-gimbal coupled to a head/write head 116. The un-dampened vibration sensor mechanical impedance plot 504 represents that of a vibration sensor that is directly attached to the main body 202 of the actuator assembly 200 without an intervening dampening assembly 212. The damped vibration sensor mechanical impedance plot 506 represents that of a vibration sensor coupled to the main body 202 of the actuator assembly 200 by way of an intervening dampening assembly 212.

As shown by the plots, the mechanical impedance plot 506 of the dampened vibration sensor matches a shape of the mechanical impedance plot 502 of the head-disc interface. In contrast, the mechanical impedance plot 504 of the un-dampened vibration sensor does not feature a matching shape, at least for lower frequencies displayed on the graph 500. Matching mechanical impedances indicates that a vibration sensor will experience similar excitations as those experienced by a read/write head—without requiring a vibration sensor to be positioned at and on each read/write head or suspension. As such, the vibration sensor will generate a disturbance response signal reflective of how the read/write head responds to a disturbance (e.g., shock event).

Figure 6:
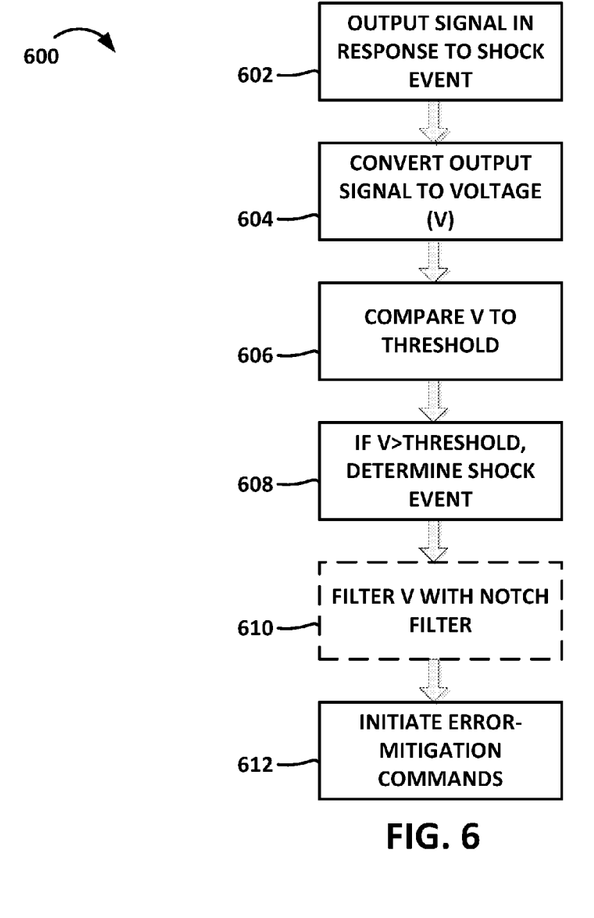
FIG. 6 graphically represents various steps of a method, in accordance with certain embodiments of the present disclosure.

FIG. 6 illustrates various steps of a method 600 for correcting for a disturbance, such as a shock event. A potential shock event is detected by a vibration sensor (e.g., 226 in FIG. 4), which outputs a signal (e.g., generated charge) to a preamplifier (e.g., 230 in FIG. 3) (step 602). The output signal may be in response to the vibration sensor detecting a wave or waves induced in an actuator assembly in response to a shock event. For example, a shock event caused by a read/write head contacting a magnetic recording medium may cause waves to travel through a path including hard drive's head-gimbal assembly, suspension, actuator assembly arm, actuator assembly body, dampening assembly, and to a vibration sensor assembly. As discussed above, the dampening assembly may absorb and dampen amplitudes of the waves. Further, the dampening assembly may be designed to match mechanical impedance of the head-gimbal assembly and suspension such that the vibration sensor detects waves with characteristics similar to those experienced by the read/write head.

The preamplifier 230 processes the output signal of the vibration sensor and coverts the output signal into an output voltage signal (step 604). The preamplifier also compares the output voltage signal against a predetermined or dynamically-established threshold (step 606). If the output signal is greater than the established threshold, a shock event occurrence is identified (step 608). Optionally, the preamplifier may include a notch filter that filters the output signal (step 610). Upon determining a shock event, the preamplifier may initiate commands to mitigate reading or writing errors (step 612). For example, commands may be initiated to turn off a reading or writing command or rotate an actuator assembly to move read/write heads off a magnetic recording medium (e.g., park a read/write heads on a ramp positioned off the magnetic recording medium).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:
   an actuator assembly;
   a dampening assembly coupled to the actuator assembly; and
   a vibration sensor assembly including a piezoelectric-based vibration sensor, coupled to the dampening assembly and coupled to the actuator assembly by way of the dampening assembly, wherein the piezoelectric-based vibration sensor has a resonant frequency within a range of 50-400 kHz.

2. The apparatus of claim 1, wherein the actuator assembly includes a main body and at least one arm extending from the main body.

3. The apparatus of claim 2, further comprising:
   a suspension coupled to the at least one arm; and
   a read/write head coupled to the suspension,
   wherein the dampening assembly is configured to dampen vibration to the vibration sensor assembly such that a mechanical impedance of the vibration sensor assembly matches a mechanical impedance at a head-disc interface.

4. The apparatus of claim 1, wherein the dampening assembly is configured to dampen vibration to the vibration sensor assembly.

5. The apparatus of claim 4, wherein the dampening assembly includes a plurality of dampening layers.

6. The apparatus of claim 5, wherein the plurality of dampening layers includes a portion of a flexible circuit having at least one conductive layer and at least one polymer layer.

7. The apparatus of claim 6, wherein the vibration sensor assembly is directly coupled to one of the at least one conductive layers via solder pads.

8. The apparatus of claim 6, wherein the vibration sensor assembly is partially positioned within a cut-away portion of one of the at least one polymer layers.

9. The apparatus of claim 6, wherein the at least one polymer layer comprises polyimide.

10. The apparatus of claim 6, wherein the dampening assembly comprises a stiffener, and wherein the at least one conductive layer and the at least one polymer layer are positioned between the vibration sensor assembly and the stiffener.

11. The apparatus of claim 6, further comprising:
a preamplifier chip electrically coupled to the portion of the flexible circuit and the vibration sensor assembly.

12. The apparatus of claim 1, further comprising:
a base deck and cover coupled together to define a cavity that houses the actuator assembly, the dampening assembly, and the vibration sensor assembly.

13. The apparatus of claim 1, wherein the vibration sensor assembly is directly coupled to the dampening assembly.

14. A hard drive comprising:
a base deck and cover coupled together to define a cavity;
an actuator assembly coupled to the base deck and positioned within the cavity;
a vibration sensor assembly having a piezoelectric-based vibration sensor and coupled to the actuator assembly; and
means for dampening amplitudes of a servo-write off-track event to the vibration sensor assembly, the means for dampening being coupled to and positioned between the actuator assembly and the vibration sensor assembly.

15. A hard drive comprising:
a base deck and cover coupled together to define a cavity;
an actuator assembly coupled to the base deck, including at least one arm, and positioned within the cavity;
a suspension coupled to the at least one arm;
a read/write head coupled to the suspension via a head-gimbal assembly;
a vibration sensor assembly having a piezoelectric-based vibration sensor and coupled to the actuator assembly; and
a dampening assembly positioned between the actuator assembly and the vibration sensor assembly, wherein the dampening assembly is configured to dampen vibration to the vibration sensor assembly such that the vibration sensor assembly senses excitations at frequencies similar to those excitations experienced at the read/write head but at lower amplitudes.

16. The hard drive of claim 15, wherein a mechanical impedance of the vibration sensor assembly matches a mechanical impedance of a head-disc interface, wherein a mechanical impedance at the vibration sensor assembly matches a profile of the first mechanical impedance.

17. The hard drive of claim 16, wherein the mechanical impedance of the head-disc interface includes a mechanical impedance of the suspension and a mechanical impedance of the head-gimbal assembly.

18. The hard drive of claim 15, wherein the piezoelectric-based vibration sensor has a resonant frequency within a range of 50-400 kHz.

19. The hard drive of claim 15, wherein the piezoelectric-based vibration sensor has a resonant frequency within a range of 20-67 kHz.

* * * * *